United States Patent [19]

Archuleta

[11] 3,938,694

[45] Feb. 17, 1976

[54] EVAPORATIVE COOLER COVER

[76] Inventor: William A. Archuleta, 4979 S. 4055 West, Kearns, Utah 84118

[22] Filed: May 6, 1974

[21] Appl. No.: 467,188

[52] U.S. Cl. .................................. 220/77; 138/147
[51] Int. Cl.² ......................... B65D 7/42; F16L 9/14
[58] Field of Search .......... 220/4 R, 4 F, 77, 75, 76; 138/97, 98, 99, 147, 156, 157, 158, 159, 168

[56] References Cited

UNITED STATES PATENTS

| | | | |
|---|---|---|---|
| 2,752,950 | 7/1956 | Coulters | 138/159 X |
| 3,244,388 | 4/1966 | Coffman | 138/147 X |

Primary Examiner—George E. Lowrance
Assistant Examiner—Steven M. Pollard
Attorney, Agent, or Firm—H. Ross Workman; J. Winslow Young

[57] ABSTRACT

A method and apparatus for enclosing air entry sections of an evaporative cooler. The cooler cover is fabricated as cooperating planar elements having interlockable segments along juxtaposed edges. The panels interlock to tightly envelope the cooler when the cover is assembled and when the final two juxtaposed edges of the assembled cover are brought together. An insulative pad on the interior face of each panel seals the underlying air entry section of the cooler against inclement weather.

4 Claims, 4 Drawing Figures

EVAPORATIVE COOLER COVER

BACKGROUND

1. Field of the Invention

The present invention relates to evaporative coolers and more particularly to improved covers for evaporative coolers.

2. The Prior Art

Evaporative coolers operate on the well-known principle of cooling by the evaporation of water. The heat of vaporization is absorbed from the air in contact with the evaporating water. Greater air to water contact is provided by creating air flow through a porous filter pad moistened with water. Most conventional evaporative coolers are box-like and have louvered sides with porous filter pads placed across the louvered openings. Water is percolated over the filter pads while air is drawn through the moist pads by an electrically driven blower. The cool air is then directed into the desired building space by conventional duct systems.

During extended periods of cooler weather, when the cooler is not in operation, it is desirable to seal the cooler to both protect the internal mechanism thereof and to prevent cold ambient air from blowing through duct work into the building. Historically, covers for evaporative coolers have been fabricated from a waterproofed fabric material or plastic sheeting. These materials have proven unsatisfactory as cooler covers for several reasons: (1) the material is subject to rapid deterioration through weathering; (2) the material insufficiently insulates the cooler openings from cold weather; and (3) fabric or plastic sheeting covers tend to flutter or vibrate in wind and transmit a "drumming" sound through the cooler duct work.

In recognition of these shortcomings, certain prior art devices have been proposed. Examples of two such devices are disclosed in U.S. Pat. Nos. 3,006,498 and 3,379,481. These devices include rigid panels hingedly and permanently affixed to the cooler body. It will be noted that both of these prior art devices require that the covering panels remain permanently affixed to the cooler and thereby create additional problems such as being subject to wind damage and restricting air flow to the cooler thereby inhibiting the efficiency of the same.

It would, therefore, be an improvement in the art to provide a completely removable cooler cover and method for sealing an evaporative cooler such that it minimizes wind-induced noise and ambient air penetration. Such a method and apparatus are disclosed by the present invention.

BRIEF SUMMARY AND OBJECTS OF THE INVENTION

The present invention discloses an apparatus and method for providing a protective cover for an evaporative cooler. Interlockable rigid panels have an insulative layer to seal each air entry opening of the cooler. Interlocking elements along juxtaposed edges of each panel releasably join each panel to an adjacent panel. Upon assembly, bringing together juxtaposed edges of the first and last panels causes a constrictive action simultaneously upon all of the interlocked panels thereby securing the cover to the cooler. Assembly, disassembly, and storage are greatly facilitated by having separable, essentially planar elements which make up the cooler cover of this invention.

It is, therefore, a principal object of this invention to provide improvements in covers for evaporative coolers.

It is another object of this invention to provide an evaporative cooler cover wherein each of the panels of the cover is provided with an insulative layer adapted to seal and insulate the underlying air entry area of the cooler.

Still another object of this invention is to provide an evaporative cooler cover wherein each panel is engageable in interlocking relationship along juxtaposed edges of adjacent panels.

One still further object of this invention is to provide a method of assembling a cooler cover wherein discrete panels are interlocked in seriatim and retained in constricting relationship about the cooler by bringing together juxtaposed edges of the first and last panels.

These and other objects and features of the present invention will become more fully apparent from the following description and appended claims taken in conjunction with the accompanying drawing.

DETAILED DESCRIPTION OF THE PREFERRED EMBODIMENTS

The invention is best understood by reference to the figures wherein like parts are designated with like numerals throughout.

Figure 1:
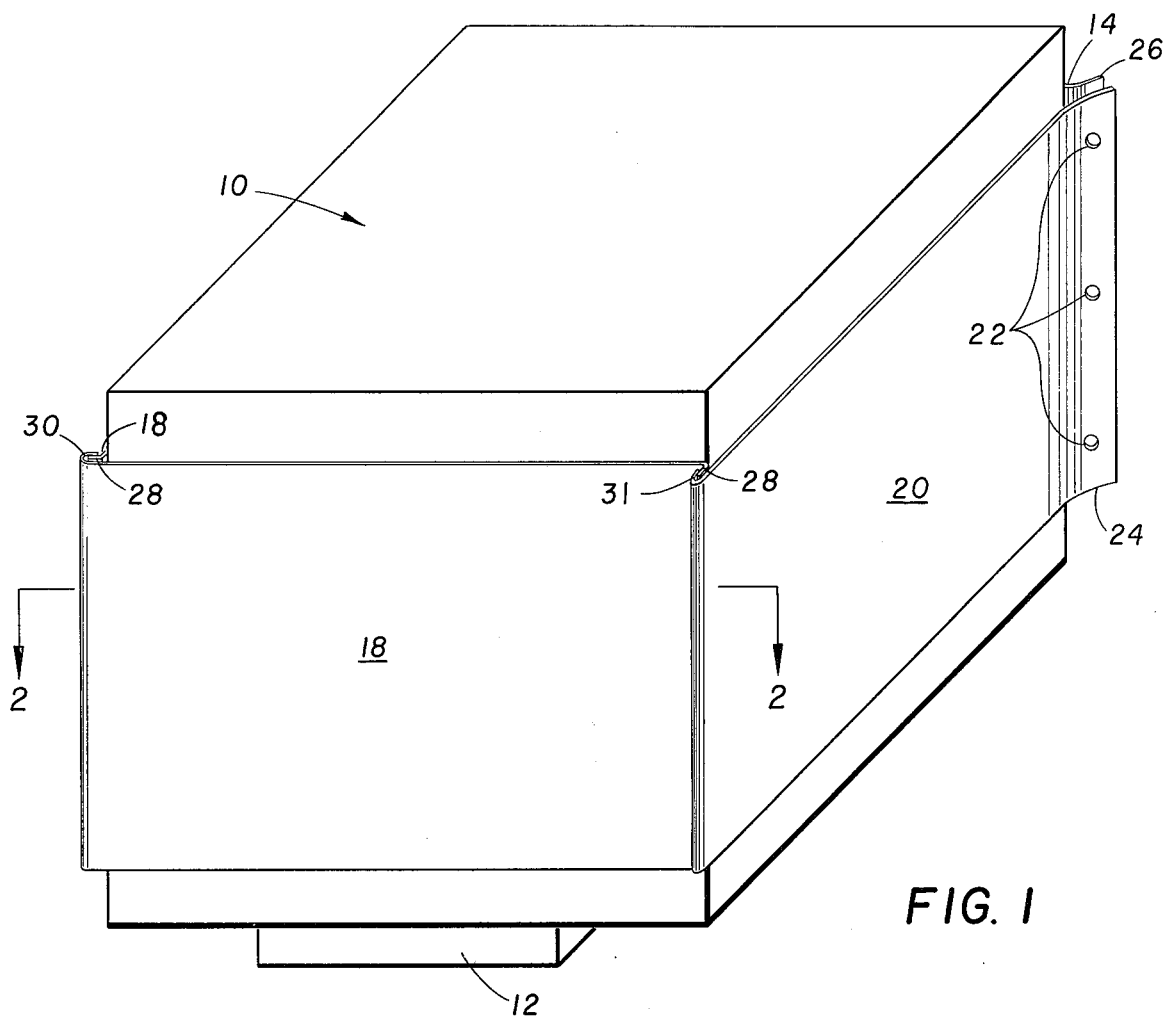
FIG. 1 is a perspective view of the cooler cover on a downward delivery cooler.

Referring now to FIG. 1, an evaporative cooler is shown generally at 10, the cooler being adapted to deliver air downwardly through a duct 12 into the cool air duct work (not shown). Cooler 10 is shown enclosed by two interlocking back panels 18 and front panels 14 and 20, respectively.

Figure 3:
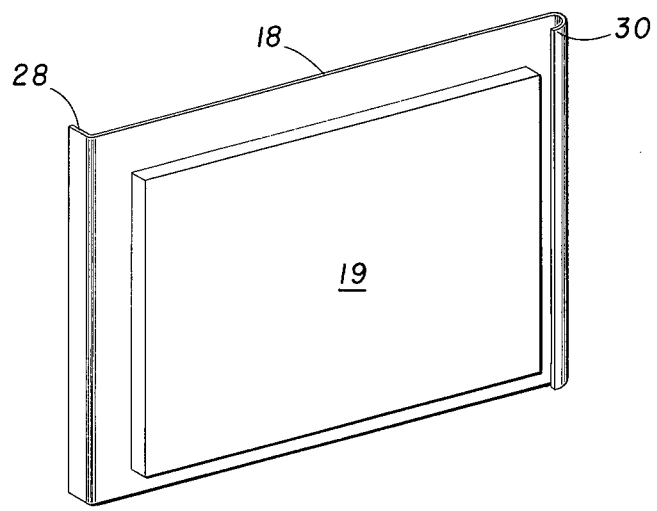
FIG. 3 is a perspective view of one panel of the cooler cover.

As illustrated best in FIG. 3, in this preferred embodiment, juxtaposed edges of adjacent back panels 18 are adapted to interlock by means of an angled edge or lip 28 which is adapted to be received into a longitudinal edge bent back inwardly upon itself into a U-shaped connecting edge 30. The connecting edge 30 cooperating with lip 28 permits easy attachment of the panels and separation thereof at the corners upon removal of the cover from cooler 10.

Front panel 14 (FIG. 2) has a lip 27 which is substantially identical to lip 28 of back panels 18. Front panel 14 has at the end opposite lip 27 a flange 26 which is used to secure the panels 14, 18 and 20 to the cooler 10. Front panel 20 is similar to front panel 14 except that a U-shaped connector 31 is located at one end and the edge opposite thereof forms a flange 24.

Each back panel 18 has on the interior face thereof an insulative pad 17 which serves to seal and insulate the underlying air entry areas 40 of the cooler. Each front panel 14 and 20 has a corresponding insulative pad 15 and 21 which may be essentially identical to pad 17. Each of the insulative pads 17, 15 and 21 is resiliently compressible and is compressed to a degree when a constrictive force is applied to flanges 24 and 26. Although an insulative pad is shown, a strip of insulative material (not shown) could be positioned on each of the panels to seal the periphery of the air entry areas 40 of the cooler.

U-shaped connecting edges 30 and 31 securely hold the lips 27 and 28 in the connectors 30 and 31 when flanges 24 and 26 are brought together, as will be more fully described hereinafter.

A plurality of apertures 22 (FIG. 1) in flange 24 of panel 20 correspond with similar apertures 21 in flange 26 of panel 14. Flanges 24 and 26 are each formed at a 45° angle to the plane of their respective panels and are thereby essentially parallel when the panels 14, 18 and 20 are assembled about cooler 10.

Upon placement of the panels about the cooler 10, as shown, further movement of flanges 24 and 26 together results in a corresponding tightening of the panels 14, 18 and 20 about the cooler 10. The panels thereby constrict the cooler 10 and seal the air entry portions of the cooler (not shown) while securely retaining the panels about the cooler in a covering relationship.

Figure 2:
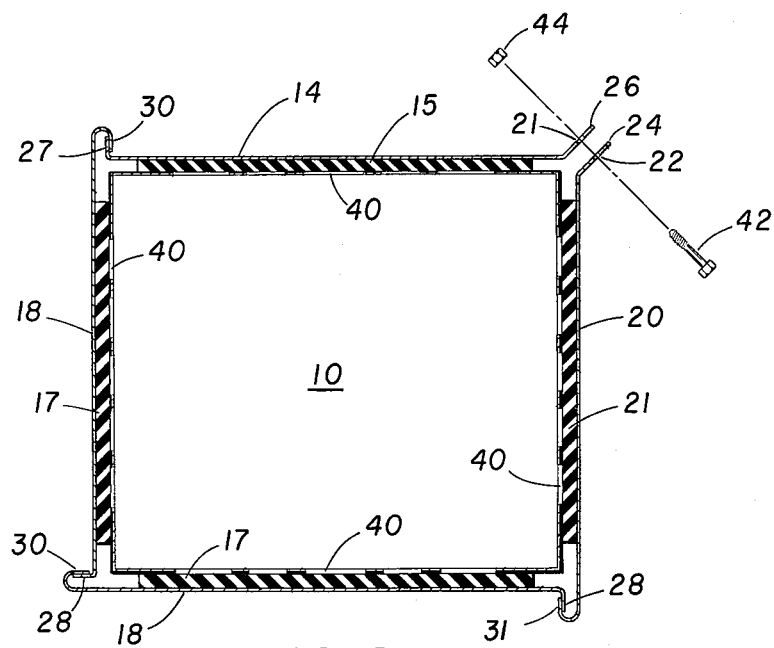
FIG. 2 is a cross-section view taken along the lines 2—2 of FIG. 1.

The procedure for securely fastening the cover about the cooler 10 is more clearly understood by reference to FIG. 2. In assembling the cooler cover, the panels 20, 18 and 14 are serially connected so that the corresponding lips 28 and 27 are inserted within the respective connectors 31 and 30. The flanges 24 and 26 are brought into parallel relationship as illustrated in FIG. 2 and a bolt 42 inserted through the aligned apertures 21 and 22. A nut 44 is threaded onto bolt 42 and secures the cover to cooler 10.

As can be appreciated by reference to the drawing, as the flanges 24 and 26 are drawn tightly together by bolts 42 and nuts 44, each joint between adjacent panels will progressively tighten. Furthermore, each insulative pad will be more tightly drawn against the periphery of the cooler 10. Thus, it can be readily ascertained that special securement structure at each joint is unnecessary.

When it is desired to remove the cover, the bolts 42 may be removed from the apertures 21 and 22 thereby releasing the tension on the panels 14, 18 and 20. Each panel may then be completely separated from the next by lifting the lip 27 or 28 from the corresponding connector 30 or 31. Thus, each panel in its separated form is essentially planar and can be easily transported and stacked for storage. Moreover, the panels may be attached to any suitably sized cooler without first modifying the cooler or providing it with special structure such as hinges, latches and the like.

Figure 4:
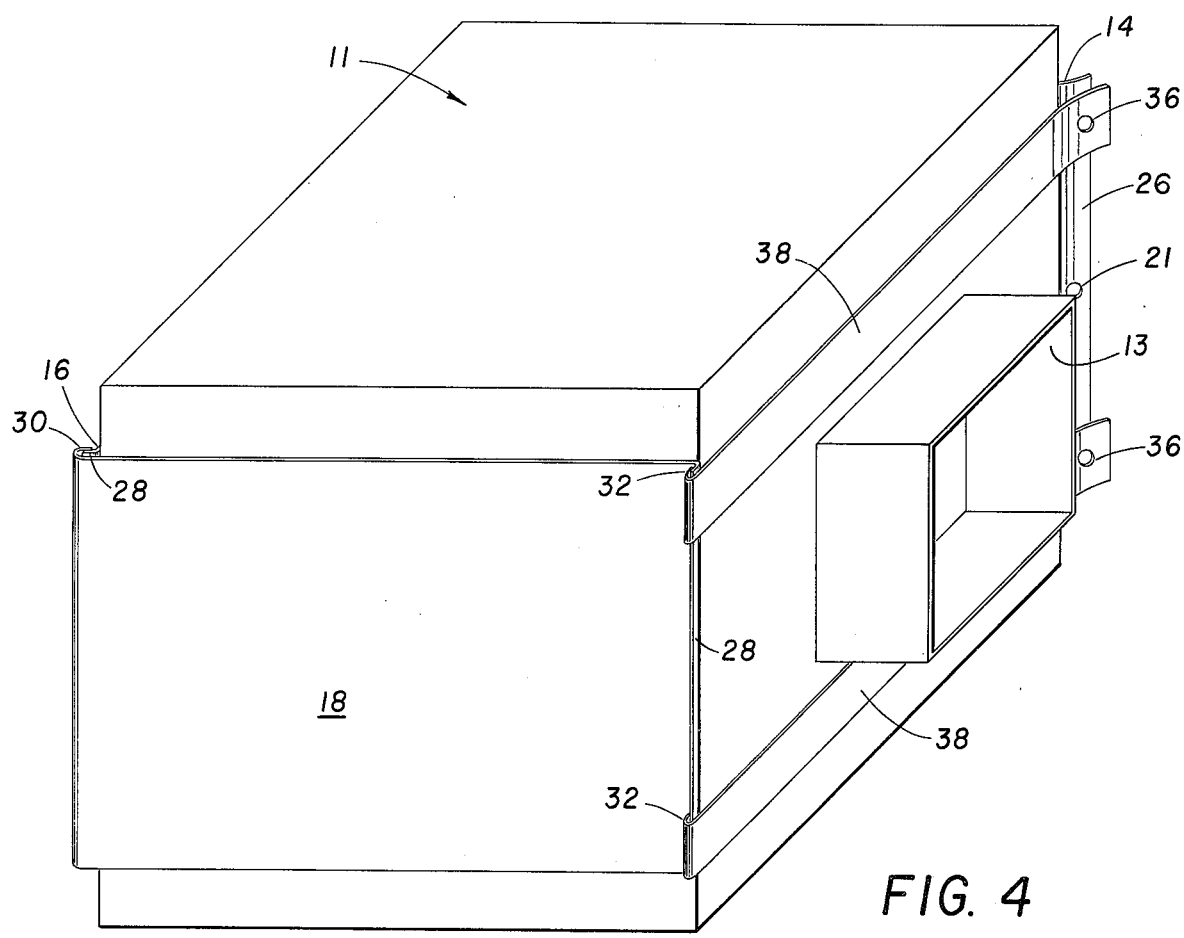
FIG. 4 is a perspective view of the cooler cover as adapted for a side delivery cooler.

Referring now to FIG. 4, a side delivery evaporative cooler generally designated 11 has a delivery duct 13 which is adapted to deliver the cooled air laterally to a desired location. The essential difference between a cooler cover adapted for a cooler 11 versus the cooler 10 is that the front panel element 20 is replaced by locking straps 38 which fit above and below air delivery duct 13. Bolt receiving apertures 36, similar to apertures 21 are provided and serve as bolt receiving openings for the application of the constricting force to the cooler cover. Comparable U-shaped connectors 32 are also disclosed and function similarly to connector 31 of the cooler cover embodiment of FIGS. 1 and 2. Of course, the particular orientation of the connectors 30, 31 and 32 and the lips 27 and 28 could be reversed within the purview of this invention. For example, lips and connectors could be switched in location and still embrace the features of this invention.

With either embodiment, assembly, disassembly and storage are greatly facilitated in that there is little or no modification required of either cooler 10 or 11. The covers for each are adapted to securely seal and insulate the air entry openings thereof. Since each panel interlocks with the adjacent panel in seriatim, disassembly is readily accomplished in a reverse order from assembly. Since each panel comprises essentially a planar element, the cover requires a greatly reduced storage area.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cover for an evaporative cooler comprising a plurality of panels adapted to cover the air entry sections of the cooler, each panel having interlocking means on juxtaposed edges for releasably interlocking the panel with each adjacent panel, each panel having an insulation interposed between the panel and the air entry sections of the cooler to seal the air entry sections of the cooler and opposed edges on the first and last panels having means accommodating means for acting directly upon said panels to simultaneously progressively tighten all panels against the cooler.

2. A cover for an evaporative cooler as defined in claim 1 wherein said panels comprise rigid sheet material.

3. A cover for an evaporative cooler as defined in claim 1 wherein each of said panels releasably interlocks with the adjacent panel along juxtaposed edges so that each panel may be serially separated from the next upon disassembly for handling and storage.

4. A cover as defined in claim 1 wherein said panels are configured to snugly engage the cooler and seal at least a portion of the periphery of the cooler without structurally altering the cooler.

* * * * *